(12) United States Patent
Sawanobori

(10) Patent No.: US 6,650,358 B1
(45) Date of Patent: Nov. 18, 2003

(54) FILM SCANNER

(75) Inventor: Keiji Sawanobori, Tokyo (JP)

(73) Assignee: Pentax Corporation, Tokyo (JP)

( * ) Notice: Subject to any disclaimer, the term of this patent is extended or adjusted under 35 U.S.C. 154(b) by 0 days.

(21) Appl. No.: 09/299,095

(22) Filed: Apr. 26, 1999

(30) Foreign Application Priority Data

Apr. 27, 1998 (JP) .......................................... 10-116950

(51) Int. Cl.[7] .......................... H04N 9/47; H04N 1/387; H04N 1/46; G06K 9/00
(52) U.S. Cl. .......................... 348/96; 358/453; 358/538; 382/319
(58) Field of Search .............................. 348/95, 96, 97, 348/98, 99, 100, 105, 108, 110, 206, 207, 208, 209; 355/37, 69, 70, 41, 50, 75; 382/162, 319; 358/453, 512, 538, 487; 40/443

(56) References Cited

U.S. PATENT DOCUMENTS

| | | | |
|---|---|---|---|
| 4,907,084 A | | 3/1990 | Nagafusa |
| 5,046,795 A | | 9/1991 | Morimoto et al. |
| 5,152,089 A | * | 10/1992 | Bellico ........................ 40/443 |
| 5,301,244 A | * | 4/1994 | Parulski ..................... 382/319 |
| 5,592,258 A | * | 1/1997 | Hashizume et al. .......... 355/41 |
| 5,663,782 A | * | 9/1997 | Saita et al. .................... 355/37 |
| 6,486,980 B1 | * | 11/2002 | Sawanobori ................ 358/487 |

* cited by examiner

Primary Examiner—Gims S. Philippe
(74) Attorney, Agent, or Firm—Greenblum & Bernstein, P.L.C.

(57) ABSTRACT

A film scanner for scanning an image on a film by an image scanner unit. A display unit for displaying the image scanned, and a film support unit for supporting another film in front of the display unit are provided. The display unit is controlled such that a white mono-chrome image is displayed for projecting the other film. Thus, the image-scan waiting time is utilized in reviewing the other film.

19 Claims, 22 Drawing Sheets

FILM SCANNER

BACKGROUND OF THE INVENTION

1. Field of the Invention

The present invention relates to a film scanner for electronically scanning and displaying an image on a photographic film.

2. Description of the Related Art

A film scanner is known that electrically scans and reads an image on a photographic film. A digital image signal is generated by the film scanner and is input to a peripheral apparatus, such as a computer, which displays the image on a display unit. This film scanner has a poor portability because it must accompany such a peripheral apparatus.

In the conventional film scanner, the image is read by an intermittently moved line sensor, which generates the digital signal for the computer. Thus, a rather long waiting time exists between the initiation of the scan and the reproduction of the image on a display.

SUMMARY OF THE INVENTION

Therefore, an object of the present invention is to provide a film scanner which efficiently utilizes the waiting time.

A film scanner according to the present invention comprises an image scanner unit that scans an image recorded on a first photographic film and a display unit that displays the image scanned by the image scanner unit. The display may be switchable to display a white mono-chrome image.

BRIEF DESCRIPTION OF THE DRAWINGS

The present invention will be better understood from the description of the preferred embodiments of the invention set forth below together with the accompanying drawings, in which.

DESCRIPTION OF THE PREFERRED EMBODIMENTS

Hereinafter, the preferred embodiments of the present invention are described with reference to the attached drawings.

Figure 1:
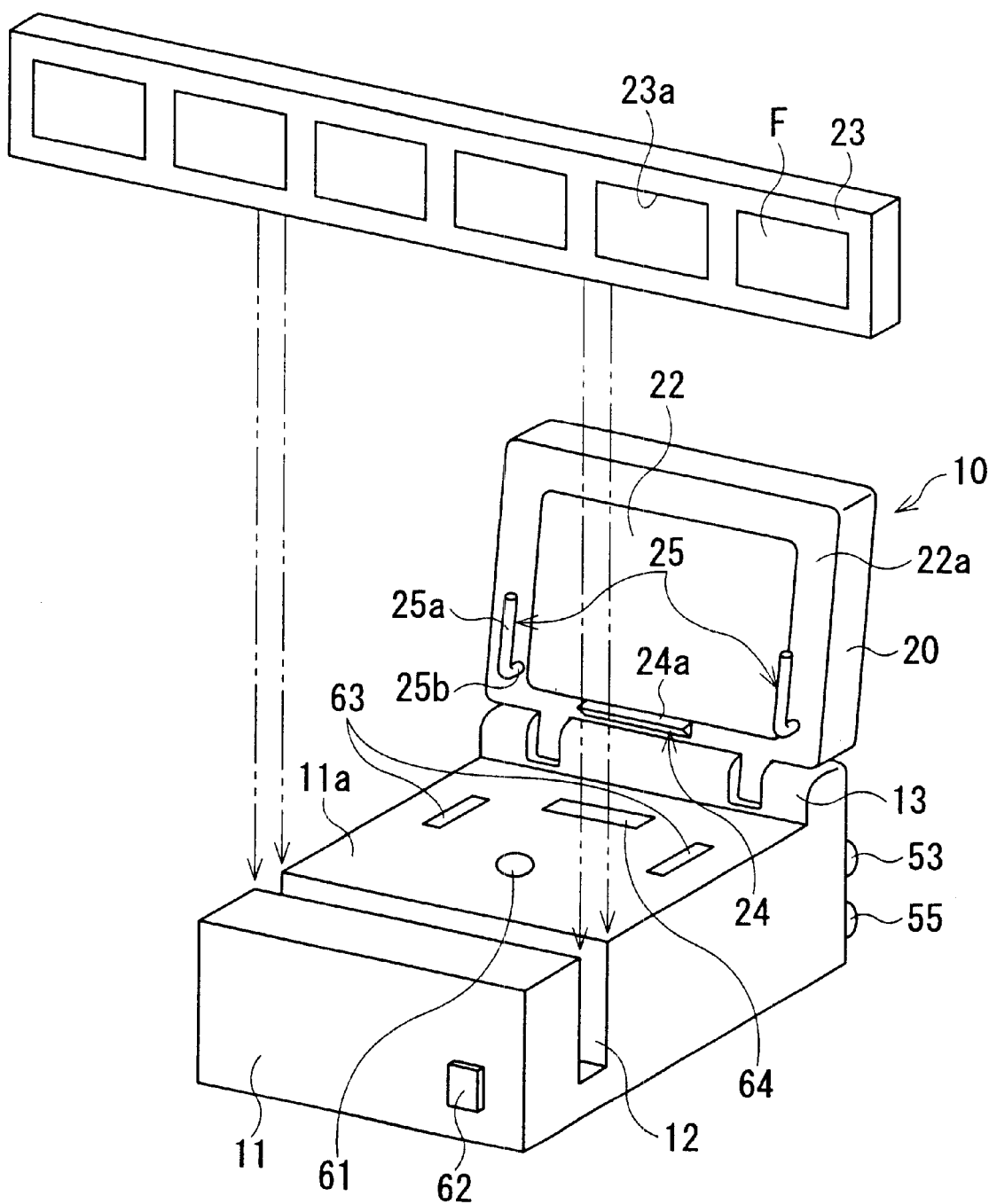
FIG. 1 is a perspective view showing a first embodiment of a film scanner according to the present invention, to which a film holder is to be inserted.
Figure 2:
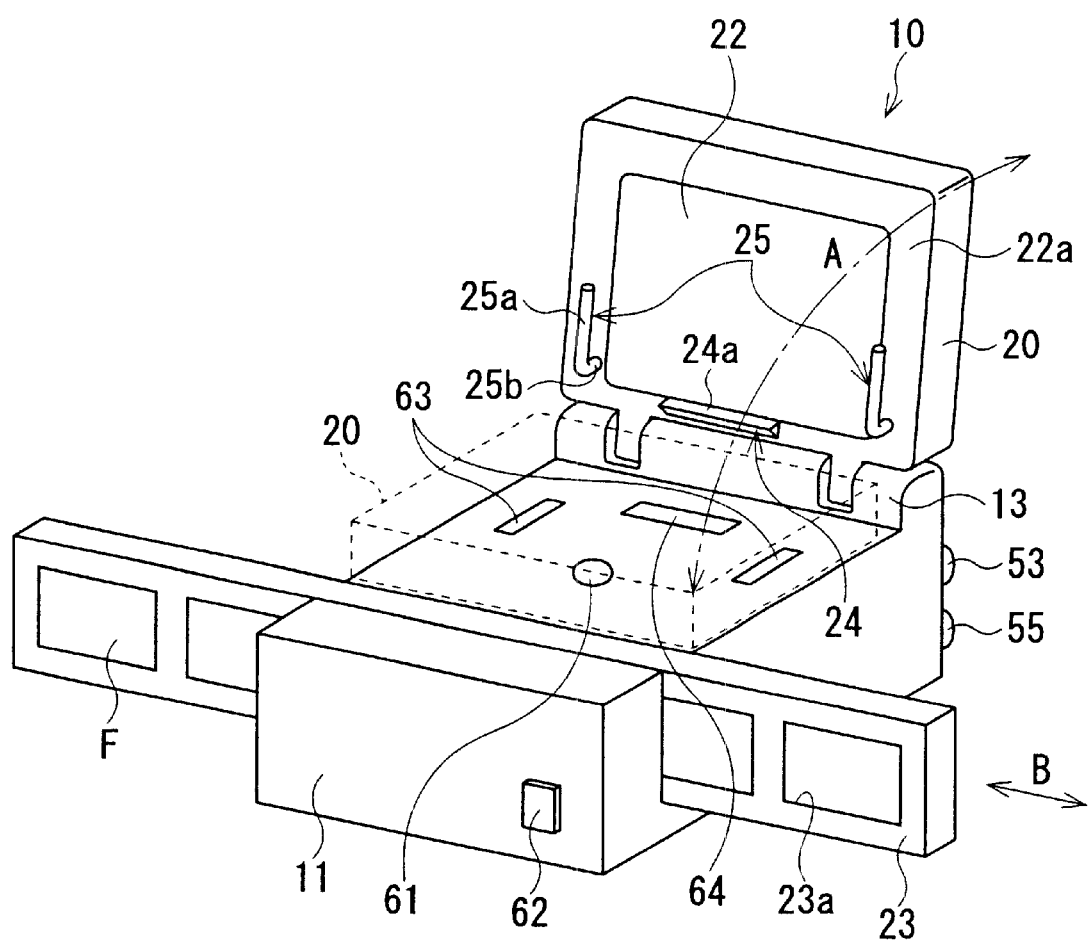
FIG. 2 is a perspective view of the first embodiment, to which the film holder is inserted.

FIG. 1 is a perspective view showing a first embodiment of a film scanner 10 according to the present invention, to which a film holder 23 is to be inserted, and FIG. 2 is a similar perspective view of the first embodiment to which the film holder 23 is inserted.

The film scanner 10 includes a body 11 which slidably (in the direction B in FIG. 2) supports the film holder 23 in a horizontal channel 12 formed in an upper surface 11a of a front portion of the body 11. A photographic film F is held in the film holder 23, in which a plurality of openings 23a are formed corresponding to frames of the photographic film F on a front and a back surface thereof. Both surfaces of each frame of the photographic film F are exposed by the opening 23a. Disposed in the horizontal channel 12, an image scanner unit 30 (shown in FIG. 4, described later) is provided for scanning an image recorded on the photographic film F. A display unit 20 is attached at a pre-formed mount 13 to the upper surface 11a of a base portion of the body 11, which allows rotational motion of the display unit 20 about a horizontal axis parallel to the horizontal channel 12, as shown by an arrow "A" in FIG. 2. The display unit 20 swings such that a display inclination is changeable and so that the display unit 20 can be folded flat against the upper surface 11a.

Figure 4:
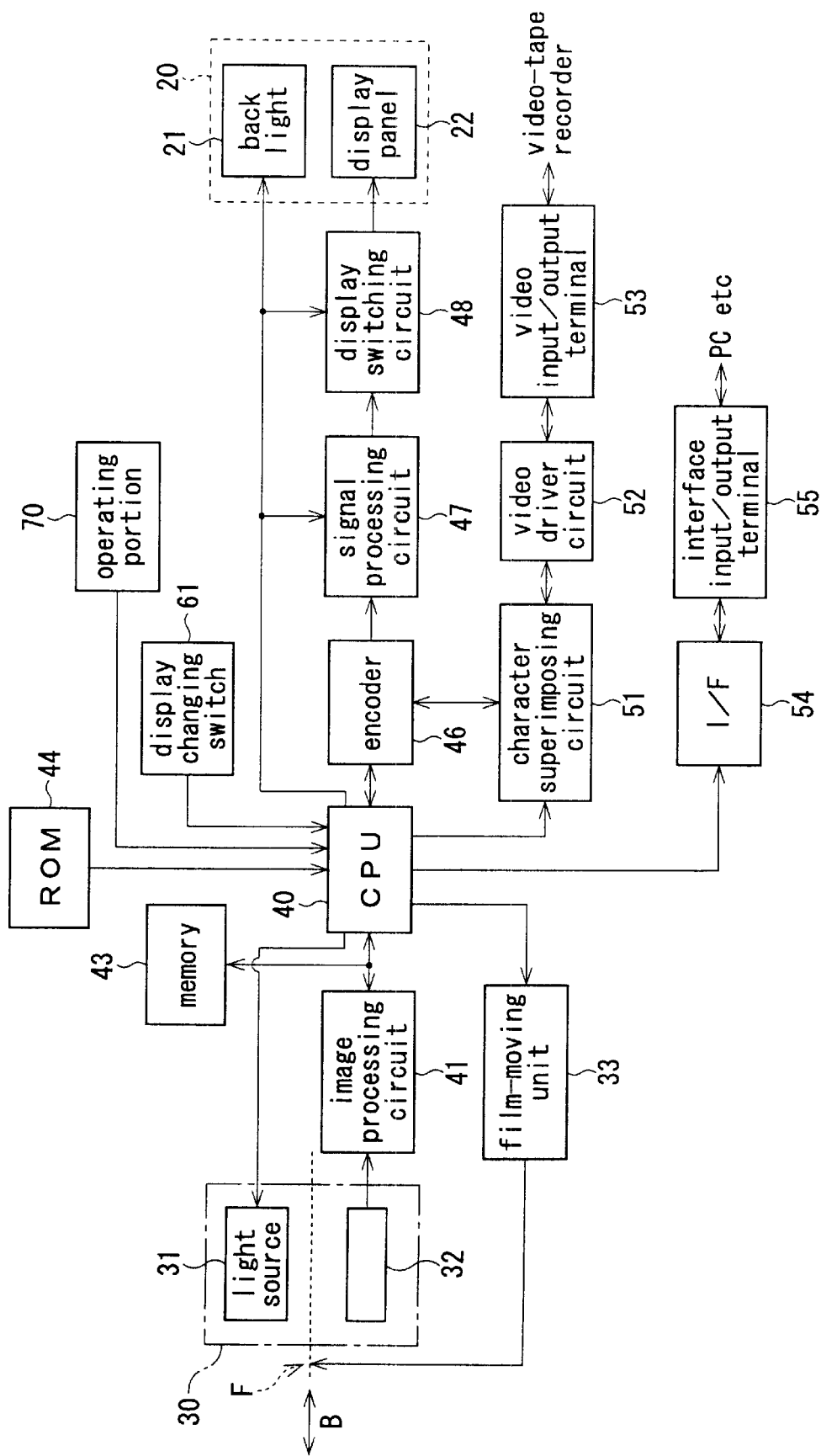
FIG. 4 is a block diagram of the film scanner of the first embodiment.

A display panel 22, facing toward a plane of the channel 12, is provided on a front surface 22a of the display unit 20, and displays the image scanned by the image scanner unit 30 (FIG. 4). The display unit 20 further includes a film support unit (24, 25), which includes a pair of L-shaped hooks 25 and a horizontal ledge 24. The horizontal ledge 24 is positioned at and extends along a middle portion of a lower edge of the display panel 22. The L-shaped hooks 25 are vertically oriented along both side edges of the display panel 22, disposed toward the lower edge thereof. The L-shaped hooks 25 have an arm-portion 25a that extends in parallel with a front face-surface of the display panel 22 for slidably receiving and vertically supporting, in a direction perpendicular to the plane of the channel 12, the film holder 23 of an upper surface of the ledge 24, operating in conjunction with an arm-portion 25b of the L-shaped hooks 25, which extends perpendicular to the front surface of the display 22, to support the inserted film holder 23. The film support unit (24, 25) supports the film holder 23 such that a light radiated by the display panel 22 is radiated through the opening 23a of the film holder 23 and beams incident on a back-surface of the film F.

A pair of recesses 63 corresponding to the L-shaped hooks 25 and a recess 64 corresponding to the ledge 24 are formed on the upper surface 11a of the body 11. When the display unit 20 is folded against the upper surface 11a, the L-shaped hooks 25 and ledge 24 are received by the recesses 63 and 64. Thus, the display unit 20 flatly abuts the upper surface 11a during storage, as shown by a broken line in FIG. 2.

A main switch 62, provided on a front surface of the body 11, controls an electrical operation of the film scanner 10. A display changing switch 61 is provided on and flush with the upper surface 11a of the body 11 for controlling the display unit 20, as described later. A video input/output terminal 53 is provide on a back surface of the body 11 for connecting a video-tape recorder (not shown) to the film scanner 10. An interface input/output terminal 55 is provided for connecting a personal computer (not shown) to the film scanner 10.

Figure 3:
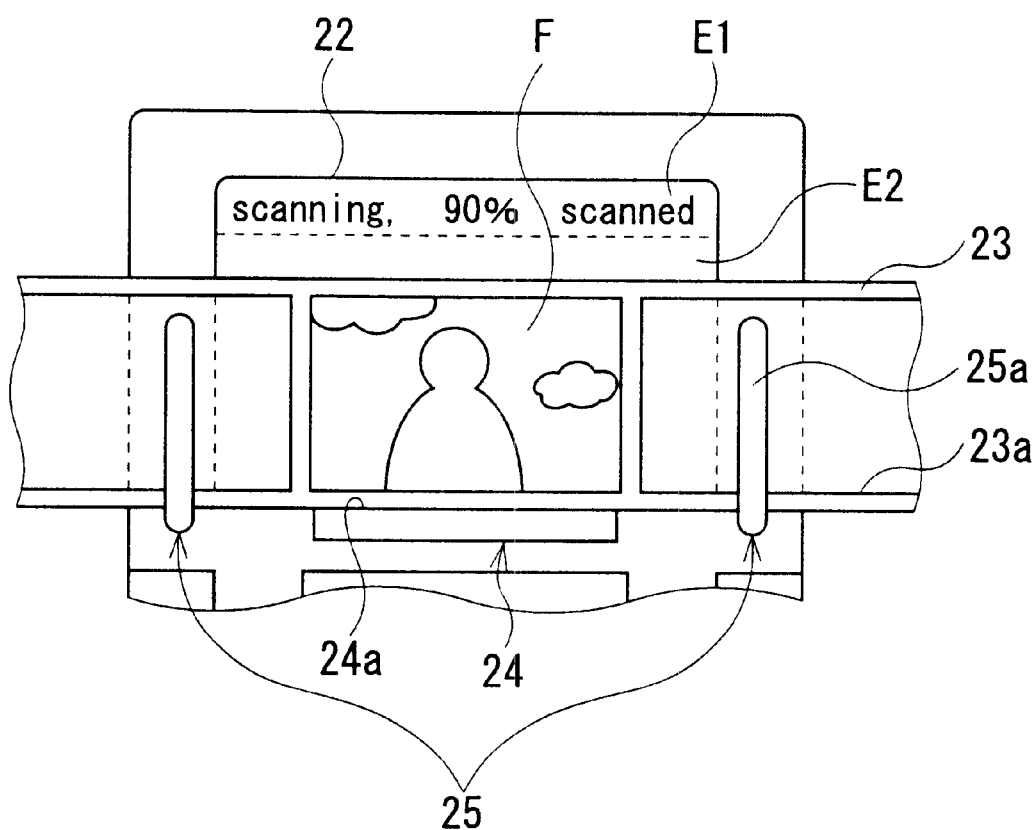
FIG. 3 is an elevational view showing a display unit of the first embodiment, which projects a film held in the film holder.
Figure 5:
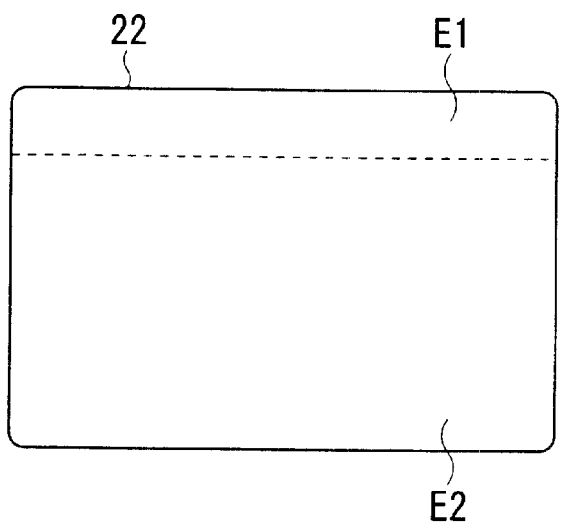
FIG. 5 is an elevational view showing a display panel of the display unit displaying a white image for projecting the film.
Figure 6:
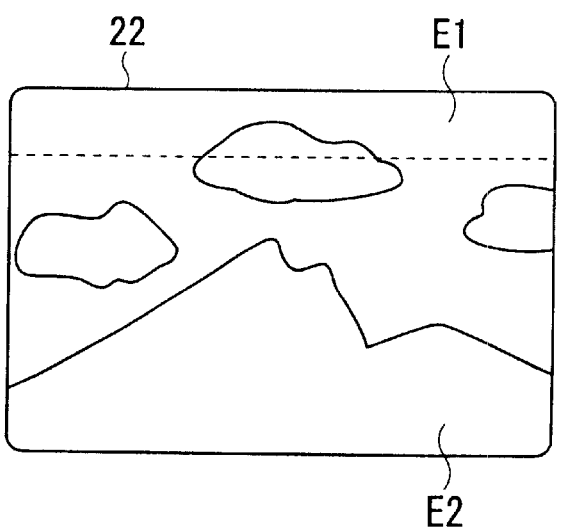
FIG. 6 is an elevational view showing the display panel of the display unit displaying an image input from an image scanner.

As conveniently shown in FIG. 6, when an image is to be displayed, the image is displayed over a total surface of the display panel 22. However, an upper narrow portion of the display panel 22 is used as a character displaying area E1, as shown in FIGS. 3, 5 and 6. In FIG. 3, the character displaying area E1 is not concealed by the film holder 23 when the film holder 23 is supported by the film support unit (24, 25). The character displaying area E1 is used for displaying a message, for example, a percentage completion of a present scanning of a current image. At this time, the display unit 20 is also used as a projector for radiating light through the opening 23a of the film holder 23 and onto the film F. When being used as the projector, the display unit 20 displays a white mono-chrome image in an image area E2, which extends the area E1 (FIG. 5), allowing a light of as high luminance as possible to be radiated. In FIG. 3, a message "Scanning, 90% scanned:", for example, is displayed in the area E1 above the film holder 23 supported by the supporting unit (24, 25). An image in a frame of the film F, positioned in front of the front surface of the display panel 22 of the white image (FIG. 5) and supported by the film supporting unit (24, 25), is projected by the display unit 20 utilized as the projector.

Therefore, a user can review the film F held by the film holder 23 during a scanning of another film F by the image scanner unit 30. Thus a waiting time during the scanning of the other film can be efficiently utilized. Consequently, a time utilization in the film scanning of the present invention is superior to that of a conventional device.

FIG. 4 is a block diagram of the film scanner of the first embodiment. The film scanner unit 30 includes a light source 31, that projects a light through the image recorded on the film F and an image scanner 32 onto which the light is incident. The image scanner 32 converts the optical image into digital signals of primary colors red (R), green (G) and blue (B). The digital signals are input to an image processing circuit 41 in which various image processes, such as shading compensation and noise reduction, are performed. The processed digital signals are then once stored in a memory 43.

The film holder 23 is moved by a film-moving unit 33, in direction B, under control of the CPU 40. The light source 31 is controlled by the CPU 40 such that the light source 31 is switched ON only when the image in the film F is to be scanned.

The processed digital signals stored in the memory 43 are read by the CPU 40 and input to an encoder 46, which encodes the R, G and B digital signals to a video signal format consisting of color differential signals (Cr, Cb) and a luminance signal (Y). The video signal is output from the encoder 46 and input to a signal processing circuit 47, which performs various processes, such as a color compensation and edge sharpening, to the video signal. The processed video signal is output from the signal processing circuit 47 to a display switching circuit 48, which may either display the image scanned in the form of the processed video signal or the white mono-chrome image for projecting the image of the film F on the display panel 22 of the display unit 20 dependent on a state of the display changing switch 61. The display panel 22 is a liquid crystal display (LCD) panel and the display unit 20 includes a back light unit 21 for illuminating the display panel 22. The CPU 40 controls a luminance flux of the back light unit 21 according to the video signal generated and a state of the display changing switch 61, i.e. if the projector is required to view an image in the film F, then the CPU 40 controls the back light 21 to radiate a high intensity luminance flux, however, if an image in film F is scanned and is to be viewed, then the CPU 40 moderates the luminance flux of the back light 21 according to the previous video signal input to the display panel 22.

A character superimposing circuit 51, controlled by the CPU 40, is connected to the encoder 46, which superimposes data corresponding to time, date, and messages stored in a ROM 44 connected to the CPU 40 or data input from an external source, such as a keyboard 70, controlled to the CPU 40 on the image to be displayed. A video driver circuit 52 is connected to the character superimposing circuit 51 and to the video input/output terminal 53, which converts the video signal into a video signal formats suitable for a video tape recorder (not shown) connected to the terminal 53. The display unit 20 can be dual-purposed used as a video monitor for the video tape recorder connected to the terminal 53.

The interface input/output terminal 55 is connected through an interface 54 to the CPU 40 such that the image stored in the memory 43 can be output through the interface 54 and the terminal 55, via the CPU 40, to the personal computer (not shown) or another peripheral apparatus connected to the terminal 55. This operation is controlled by the operation portion 70 (not shown in FIGS. 1 and 2).

FIGS. 7 to 12 show a second embodiment. The second embodiment is different from the first embodiment in that film sensors S are disposed for sensing the film F supported by the film support unit (24, 25), and the display changing switch 61 is removed. Since other portions are similar to those of the first embodiment, designations remain the same and descriptions are omitted.

Figure 7:
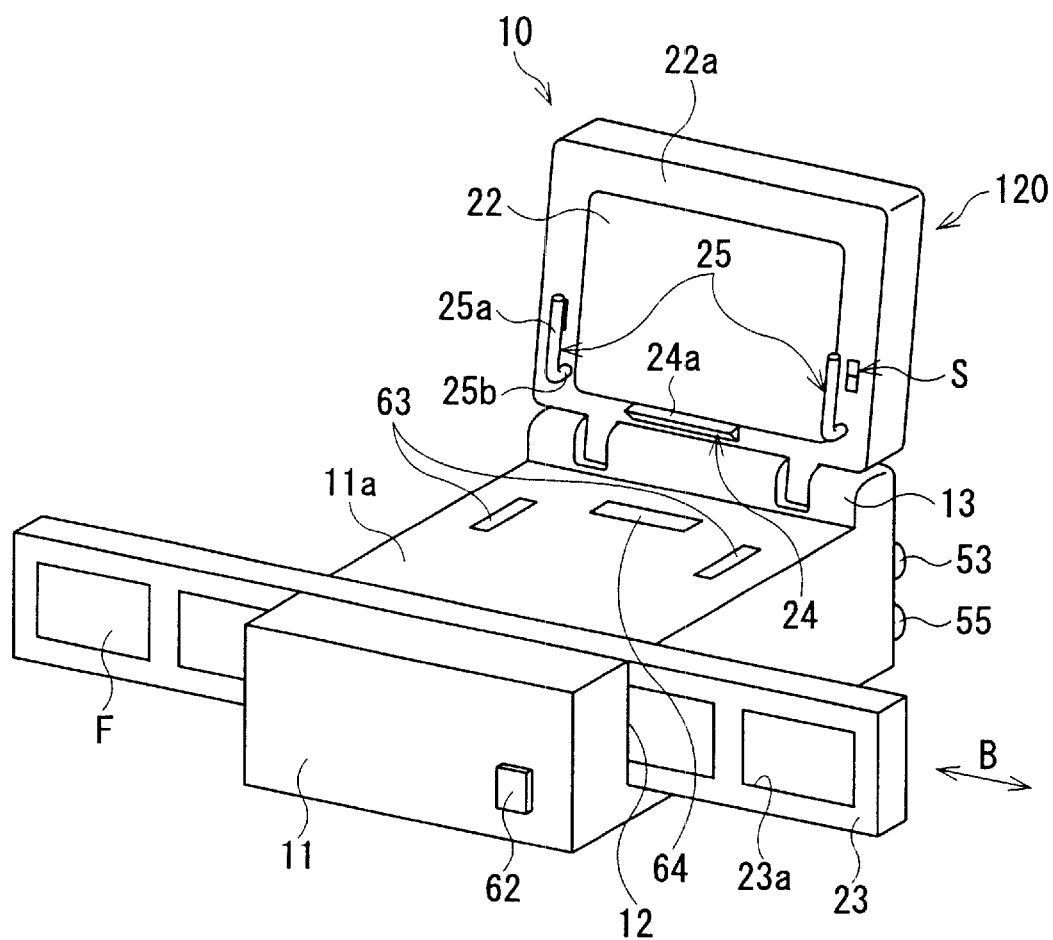
FIG. 7 is a perspective view showing a second embodiment of a film scanner to which a film holder is inserted.
Figure 8:
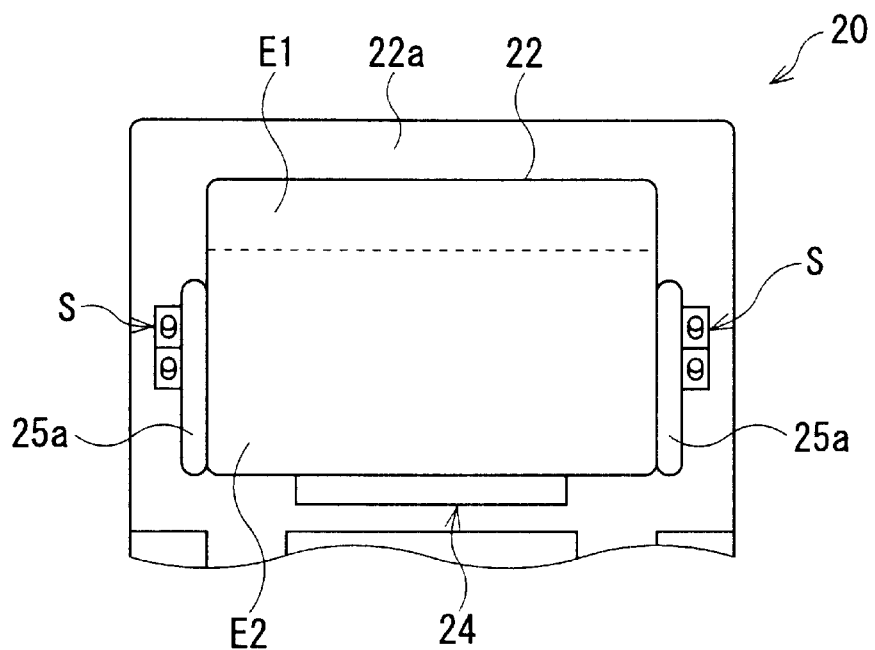
FIG. 8 is an elevational view showing a display unit of the second embodiment having a film sensor for sensing a film holder.

FIG. 7 is a perspective view showing the second embodiment of the film scanner 10 corresponding to FIG. 2, and FIG. 8 is an elevational view showing the display unit 20 viewed from a front side. The film sensors S are disposed on the front surface 22a of the display unit 20, adjacent to both side edges of the display panel 22 and to a projecting end-face of the arm-portion 25a of the L-shaped hooks 25. The film sensors S are horizontally shifted with respect to the L-shaped hooks 25, such that the L-shaped hooks 25 do not disturb a sensing performance of the film sensors S.

Figure 9:
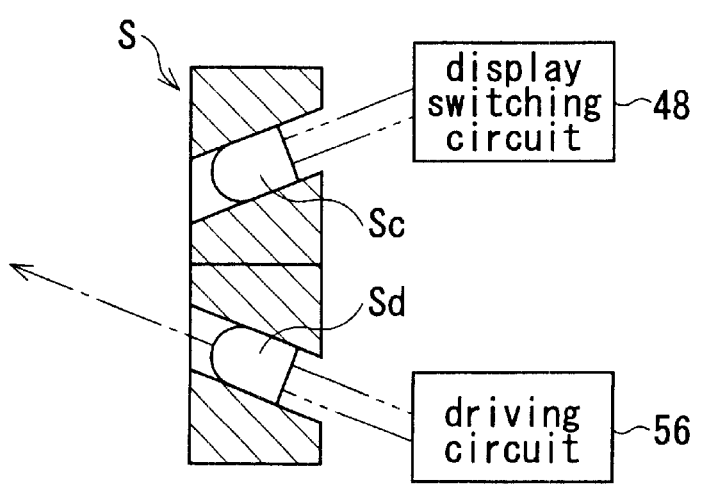
FIG. 9 is an enlarged cross-sectioned elevational view showing the film sensor of the second embodiment.
Figure 10:
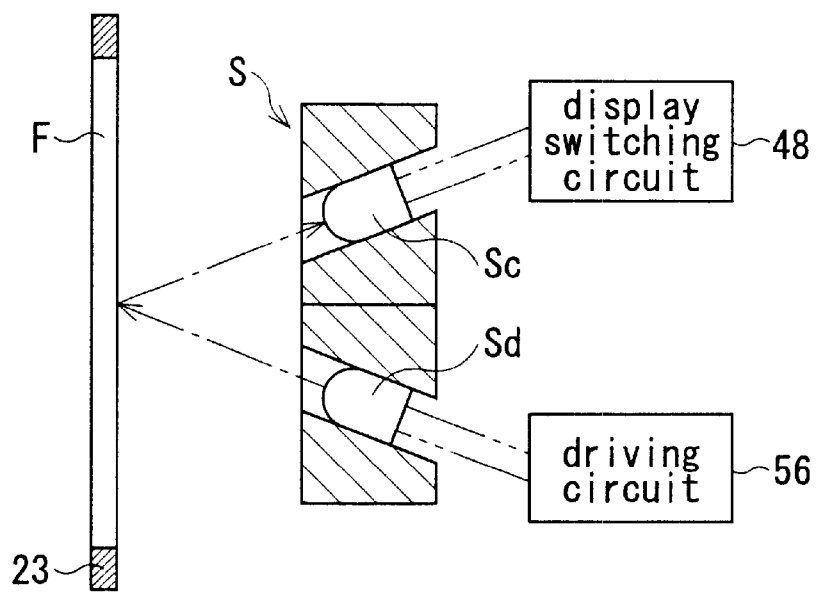
FIG. 10 is an enlarged cross-sectioned elevational view showing the sensor together with the film holder.

FIGS. 9 and 10 are cross-sectioned elevational views showing one of the sensors S. The film sensor S includes a light emitting diode (LED) Sd which emits light shown by a single-chained arrow, and a photo sensor Sc which senses the light emitted from the LED Sd and reflected by the photographic film F. The LED Sd and the photo sensor Sc are vertically aligned, with optical axes, that intersect substantially on a plane of the image in the film F, being inclined and declined respectively. When the film F does not exist, as shown in FIG. 9, the light is not reflected and does not reach the sensor Sc. When the film F exists, as shown in FIG. 10, the light is reflected by the film F and reaches the photo sensor Sc. A driving circuit 56 is connected to the LED Sd, which switches the LED Sd ON when the main switch 62 is pushed. The display switching circuit 48 is connected to the sensor Sc so that the display unit 20 displays the white mono-chrome image for projecting the film F when the film F is sensed by the sensor S.

Figure 11:
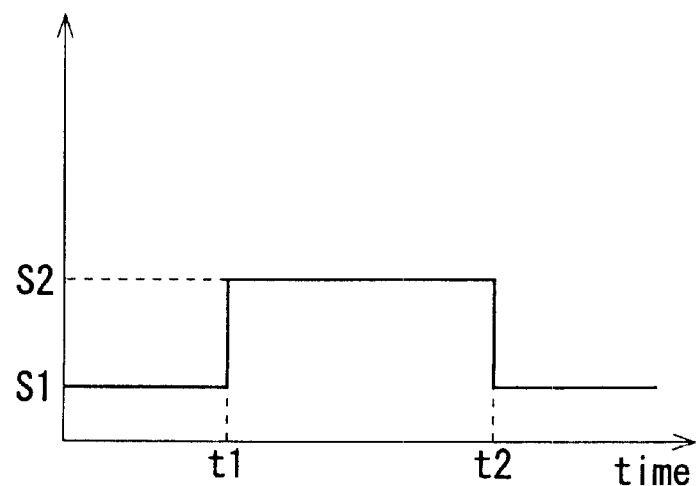
FIG. 11 is a wave-form diagram showing an output of the sensor of the second embodiment.
Figure 12:
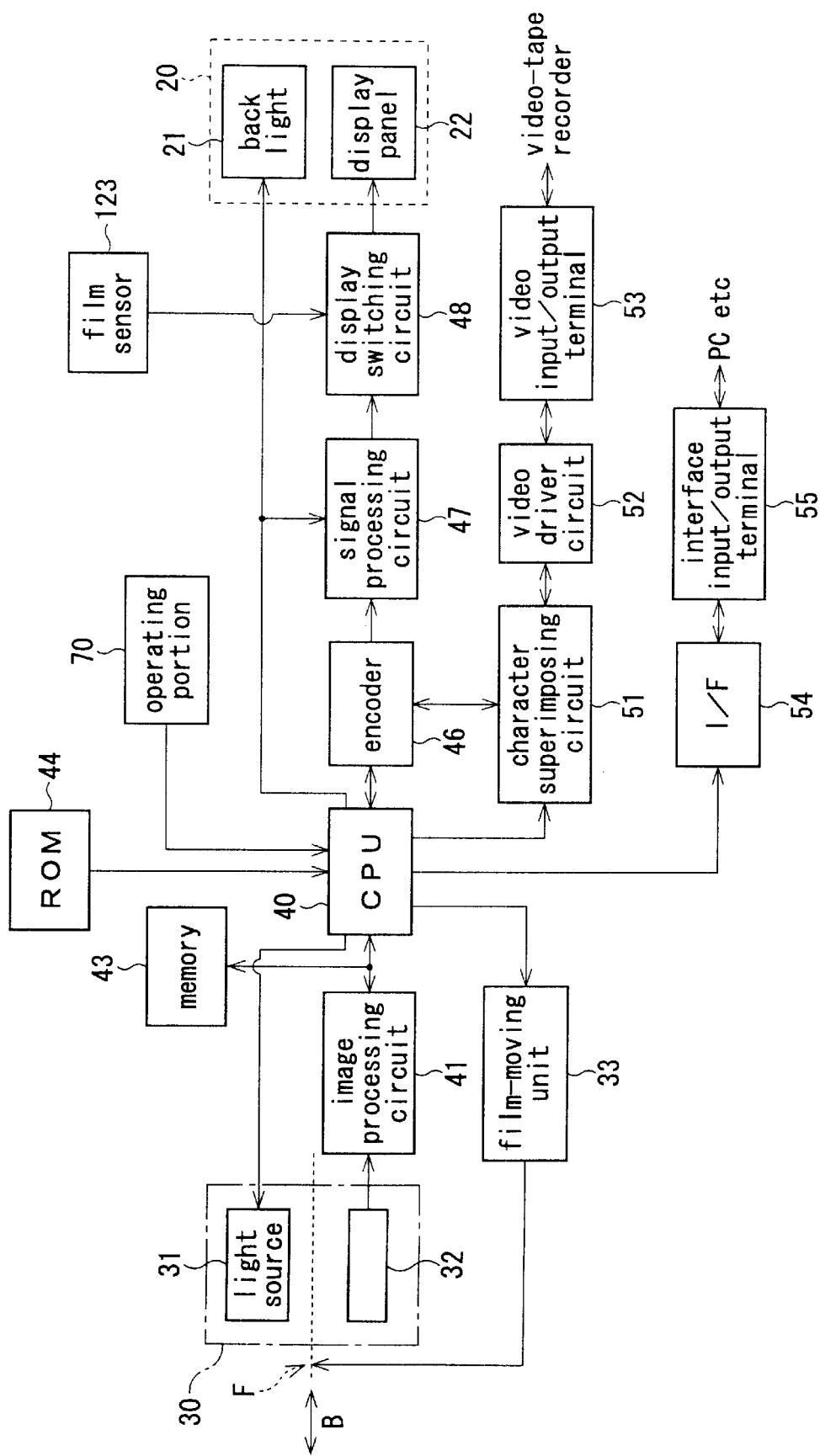
FIG. 12 is a block diagram of the film scanner of the second embodiment.

FIG. 12 is a block diagram of the second embodiment, in which the film sensors S, replacing the display changing switch 61 (FIG. 4), are connected to the display switching circuit 48. FIG. 11 shows a wave-form of an output of the sensors S. At a time t1, the sensors S sense the film F and the output rises from a level S1 to a level S2, then at a time t2, the film F is removed and the output of the sensors S falls from the level S2 to level S1.

In the second embodiment, the display 22 is automatically switched from a scanning mode to a projection mode for visualizing the photographic film F supported in front of the display panel 22. Therefore, the user of the film scanner 10 can easily confirm a content of the film F, similar to the first embodiment.

Figure 13:
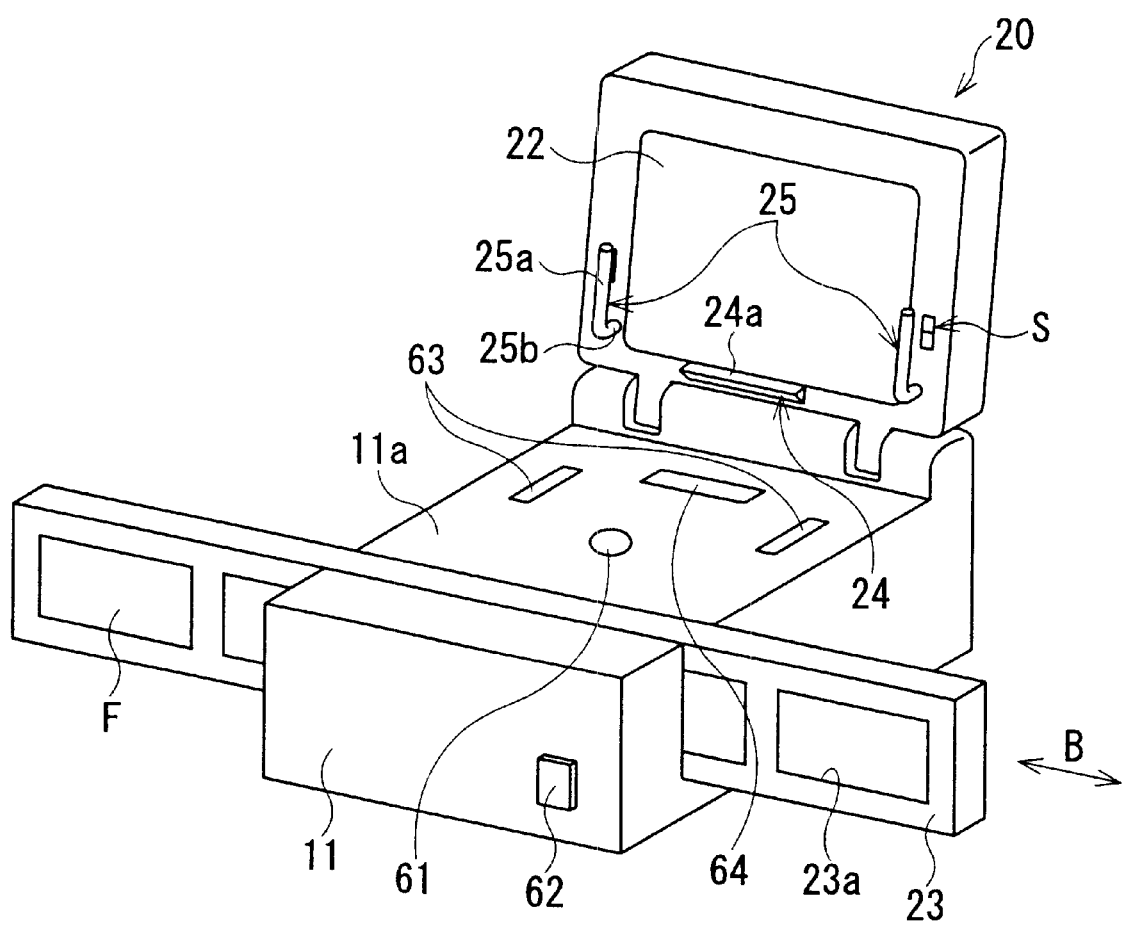
FIG. 13 is a perspective view showing a third embodiment of a film scanner to which a film holder is inserted.
Figure 14:
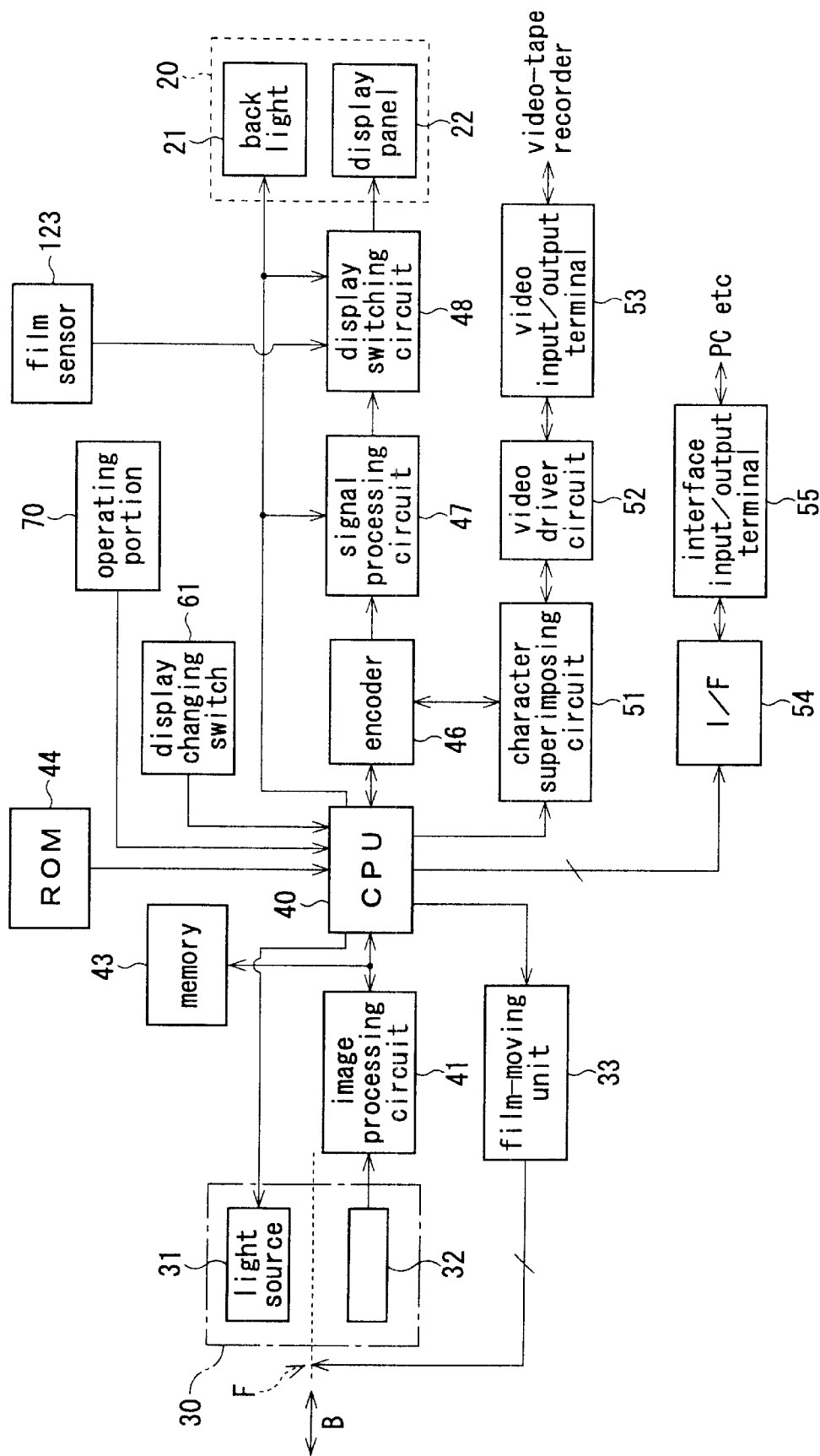
FIG. 14 is a block diagram of the film scanner of the third embodiment.

FIG. 13 is a perspective view showing a third embodiment corresponding to FIGS. 2 and 7. Again, similar portions to previous embodiments exhibit like references. The third embodiment includes both the film sensors S and the display changing switch 61. FIG. 14 is a block diagram of the third embodiment showing the display changing switch 61 connected to the CPU 40, in addition to the film sensors S connected to the display switching circuit 48. In the third embodiment, the user can select the manner of display switching. If the display panel 22 is manually changed to the white mono-chrome image, the sensing by the film sensors S are invalid, however, the display panel 22 can be changed to display the scanned image, both by the manual switch 61 and by the sensing of the removal of the film F by the sensors S.

Figure 15:
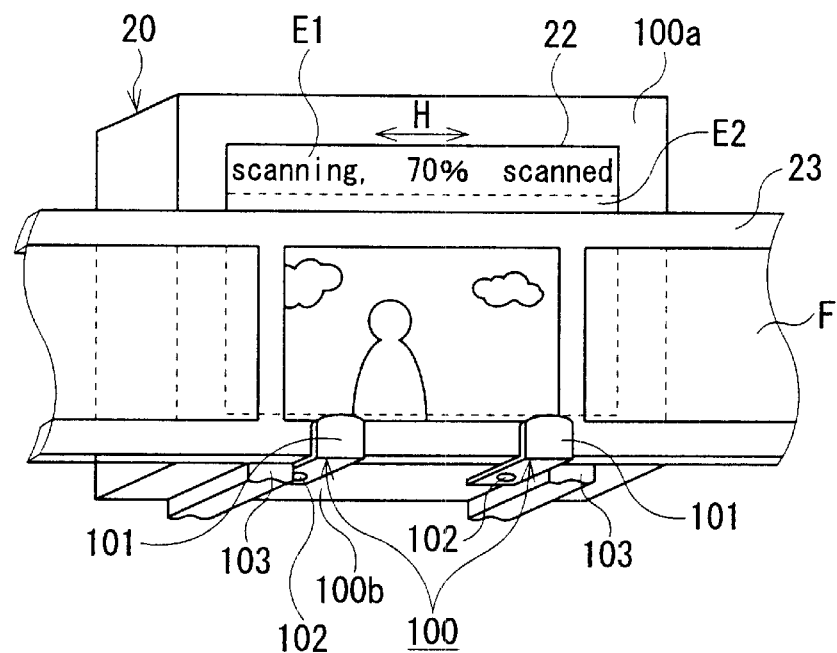
FIG. 15 is a perspective view showing a display unit of a fourth embodiment of a film scanner.

FIG. 15 is a perspective view showing the display unit 20 in a fourth embodiment. Again, similar portions to previous embodiments exhibit like references. The fourth embodiment is different from the first embodiment in that the film support unit (24, 25) of the first embodiment is substituted by a film support unit 100. The film support unit 100 includes a pair of wide L-shaped hooks 101 fixed by screws 102 to a bottom surface 100b of the display unit 20. The L-shaped hooks 101 project beyond a bottom front edge of a front surface 100a of the display unit 20, and project vertically upward parallel to the front surface 100a of the display unit 20. Since the L-shaped hooks 101 are wide, the film holder 23 is smoothly movable in a direction H and securely supported without requiring other members, such as ledge 24 (FIG. 1). The L-shaped hooks 101 are fixed to the bottom surface 100b by the screws 102 from the outside, thus reducing a manufacturing cost. A clearance, larger than the thickness of the hooks 101, is made at the bottom of the display unit 20 by feet 103 extending parallel to a longitudinal edge of the L-shaped hooks 101. The feet 103 are received in the pre-formed mount 13 (FIG. 1), while allowing sufficient space between the L10 shaped hooks 101 and an upper surface of the pre-formed mount 13, thereby allowing trouble-free rotation of the display unit 20. Consequently, the dimensional tolerances of the L-shaped hooks 101 and screws 102 can be increased, again reducing a manufacturing cost. Film sensors (S) similar to the second embodiment can be provided in this embodiment, the display changing switch (61) may be omitted or provided, as mentioned with respect to the second and the third embodiments.

Figure 16:
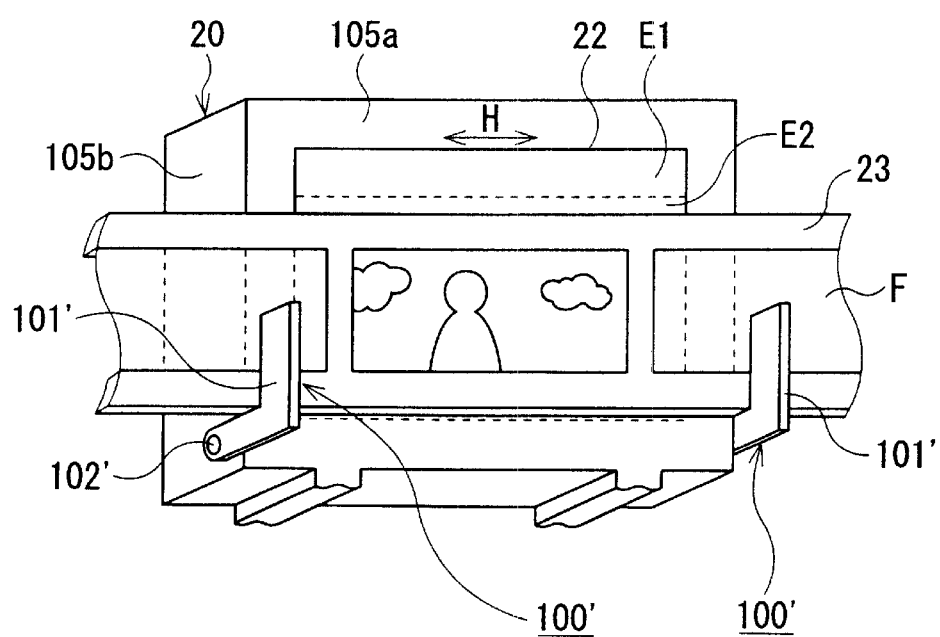
FIG. 16 is a perspective view showing a display unit of a fifth embodiment of a film scanner.

FIG. 16 is a perspective view showing the display unit 20 in a fifth embodiment. Again, similar portions to previous embodiments exhibit like references. The fifth embodiment is different from the fourth embodiment in that the film support unit 100 of the fourth embodiment is substituted by another film support unit 100'. The film support unit 100' includes a pair of thin L-shaped hooks 101 which are fixed by screws 102' on both side surfaces 105b of the display unit 20. The L-shaped hooks 101' project beyond a front side edge of a front surface 105a of the display unit 20. The L-shaped hooks 101 projects vertically upward parallel to the front surface 105a. The L-shaped hooks 101' are fixed by the screws 102' from the outside, thus a manufacturing cost is reduced. Film sensors (S) similar to the second embodiment can be provided in this embodiment, and the display changing switch (61) may be omitted or provided, as mentioned with respect to the second and third embodiments.

Figure 17:
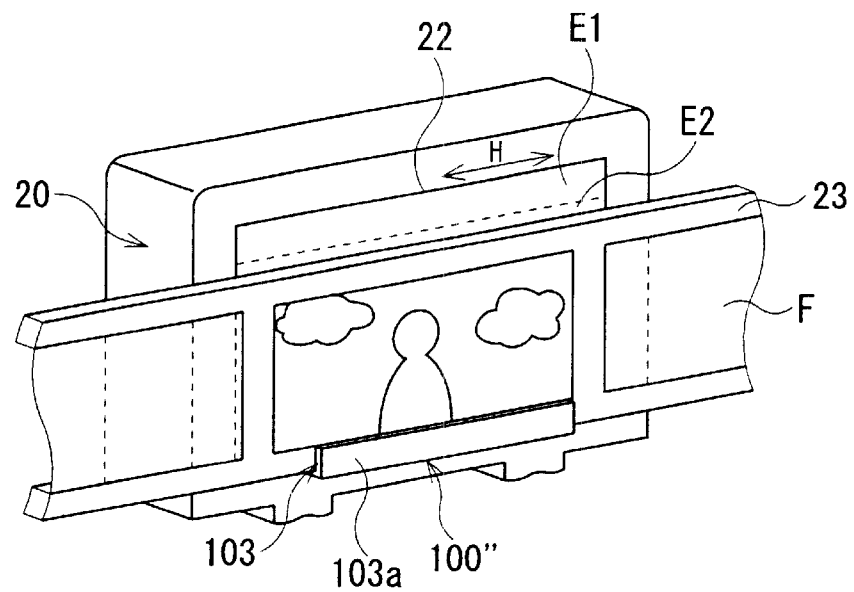
FIG. 17 is a perspective view showing a display unit of a sixth embodiment of a film scanner.

FIG. 17 is a perspective view showing the display unit 20 in a sixth embodiment. Again, similar portions to previous embodiments exhibit like references. The sixth embodiment is different from the fourth embodiment in that the film support unit 100 of the fourth embodiment is substituted by another film support unit 100". The film support unit 100" is a horizontal channel 103 opening upwardly, which is made of an L-shaped bar 103a extending along a lower edge of the front surface 22a of the display unit 20. The film support unit 100" consists of only one member 103a, thus a manufacturing cost is again reduced.

Film sensors (S) similar to the second embodiment can be provided in the sixth embodiment, and the display changing switch (61) may or may not be omitted, as mentioned with respect to the second and third embodiments.

Figure 18:
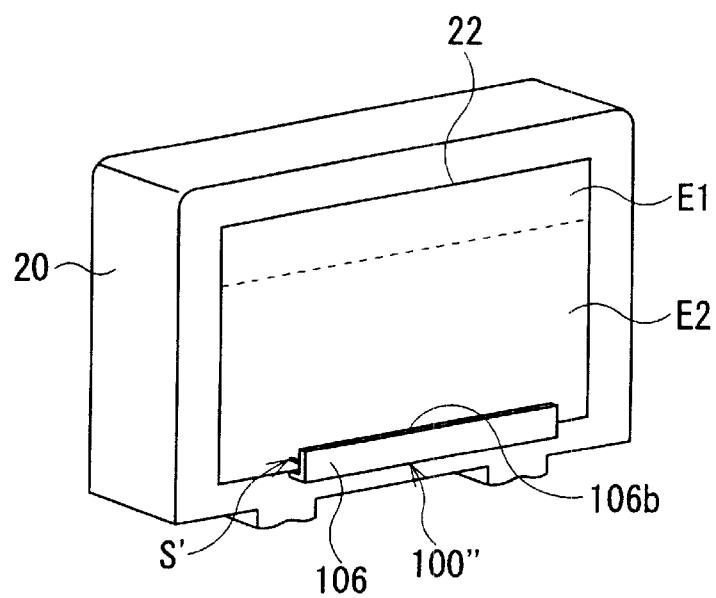
FIG. 18 is a perspective view showing a display unit of a seventh embodiment of a film scanner.
Figure 19:
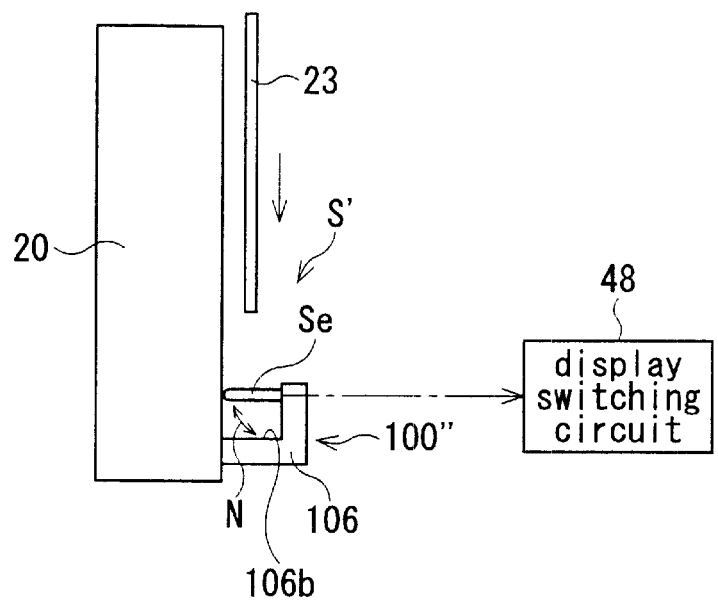
FIG. 19 is an elevational side view showing the display unit of the seventh embodiment.
Figure 20:
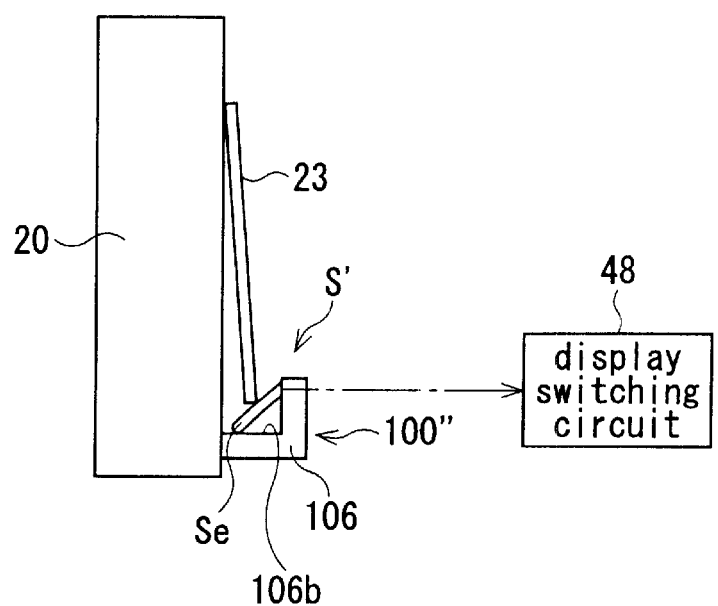
FIG. 20 is an elevational side view of showing the display unit of the seventh embodiment together with the film holder.

However, another type of film sensor S' can be used, as in a seventh embodiment shown in FIGS. 18 to 20. The film sensor S' includes a pin-like electrode Se having a base-end and a free-end, which is pivoted at its base end on a edge of the opening and of the horizontal channel 106. The electrode Se swings vertically between a horizontal angle and an oblique angle where the free-end contacts an inner bottom surface of the horizontal channel 106. The electrode Se is resiliently biased upwardly by a spring (not shown) up to the horizontal angle. The electrode Se is connected to the display switching circuit 48 and is isolated from the inner bottom surface 106b of the channel 106. When the film F is inserted into the channel 106 (FIG. 20), the electrode Se is pushed downward by the film F and contacts the bottom surface 106b. This causes a signal to be output to the display switching circuit 48 switching the back light 21 to radiate the high intensity luminance flux and the display panel 22 to exhibit the white mono-chrome image.

Figure 21:
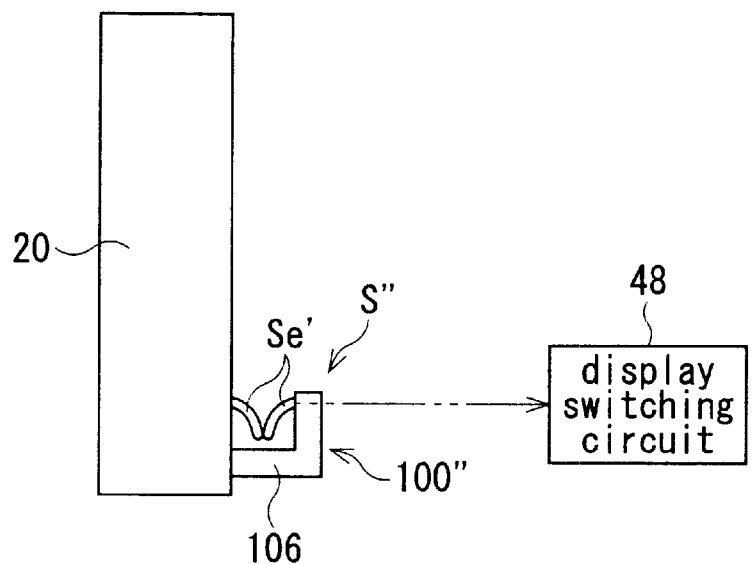
FIG. 21 is an elevational side view showing a display unit of an eighth embodiment.
Figure 22:
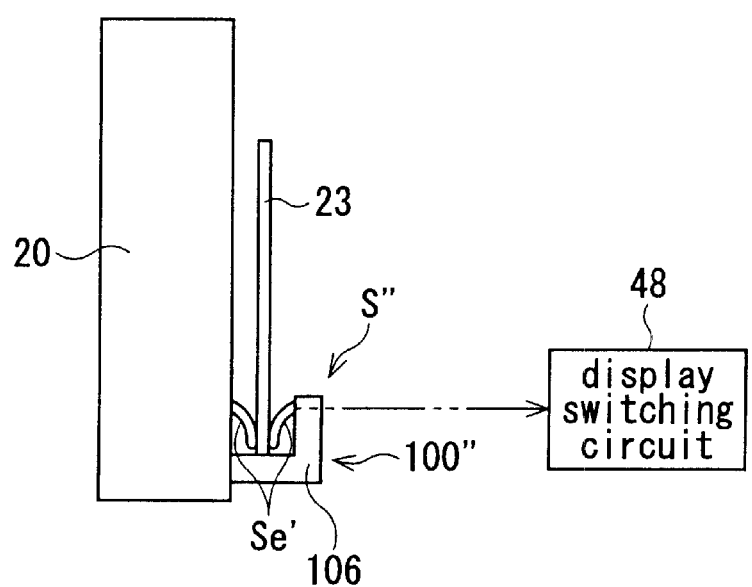
FIG. 22 is an elevational side view showing the display unit of the eighth embodiment together with the film holder.

FIGS. 21 and 22 show an eighth embodiment of another film sensor S". Again, similar portions to previous embodiments exhibit like references. The film sensor S" includes a pair of electrodes Se' inwardly and downwardly inclined. The electrodes Se' are resiliently biased against each other at lower ends thereof and fixed at opposite ends to inner side surfaces of channel 106. When the film F is inserted to the channel 106, the electrodes Se' are disconnected from each other. This causes a signal to be output the display switching circuit 48, and a similar effect to that of the seventh embodiment is achieved.

Figure 23:
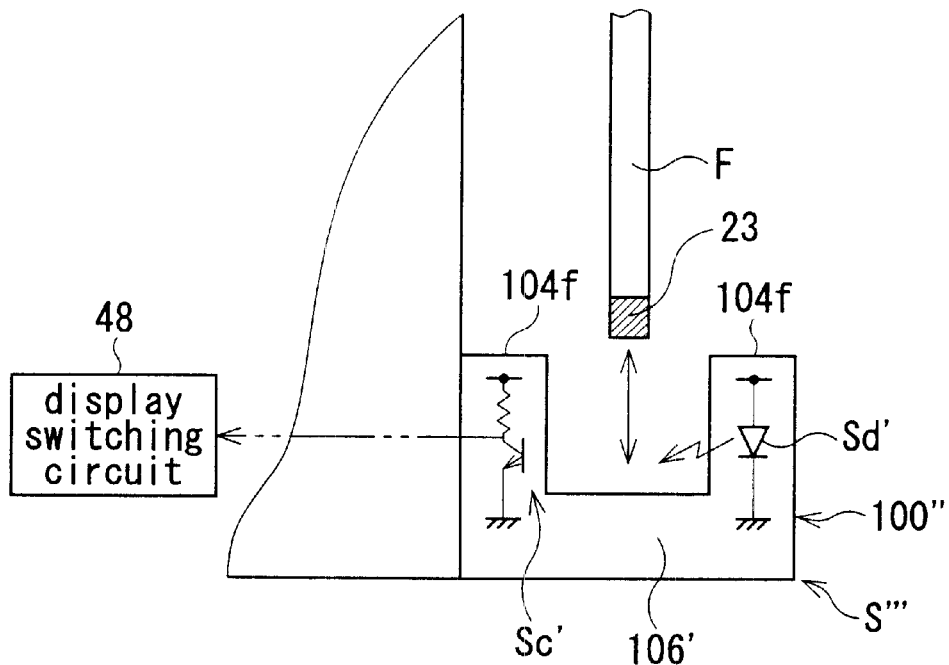
FIG. 23 is an enlarged elevational side view showing a film sensor of a ninth embodiment.
Figure 24:
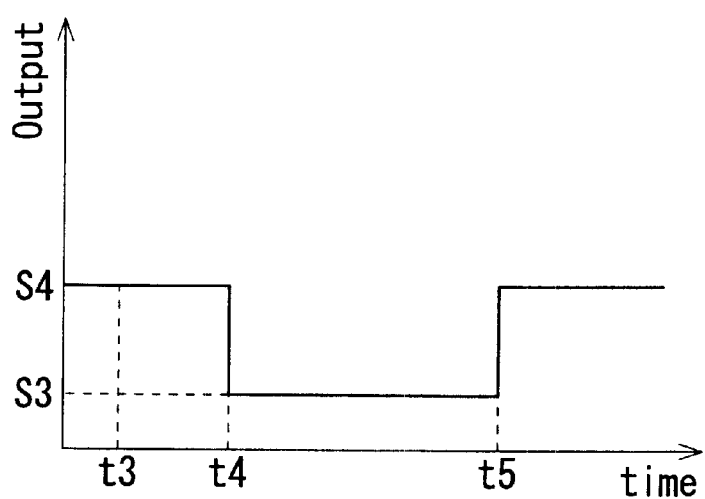
FIG. 24 is a wave-form diagram showing an output of the sensor of the ninth embodiment.

FIGS. 23 and 24 show a ninth embodiment of another film sensor S'". Again, similar portions to previous embodiments exhibit like references. In this embodiment a channel 106' has flanges 104f in which an LED Sd' and a photo sensor Sc' are disposed. The LED Sd' emits light toward the sensor Sc'. When the film F is inserted into the channel 106' the light of the LED Sd' is blocked by a frame of the film holder 23 and an output of the sensor Sc' changes, shown in FIG. 24. At a time t3 on output has a high level of S4 and, at a time t4 when the light is blocked, the output falls to a low level S3. When the film F is removed the level rises to S4 again at a time t5. Thus, a similar effect to that of the seventh embodiment is achieved.

Figure 25:
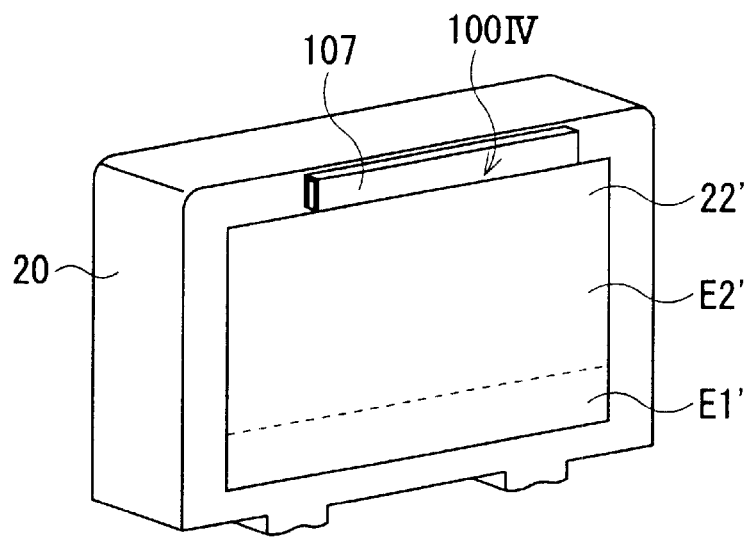
FIG. 25 is a perspective view of a display unit of a tenth embodiment.
Figure 26:
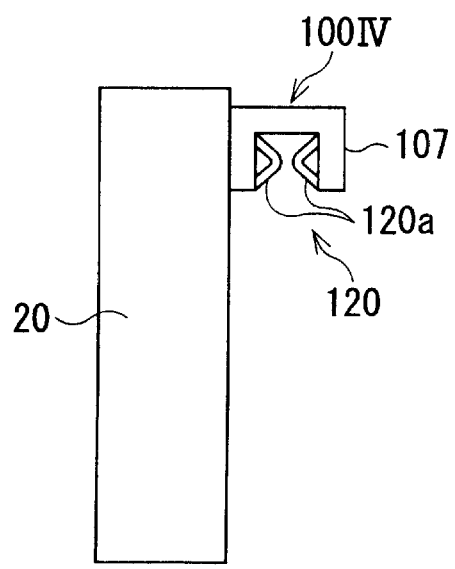
FIG. 26 is an elevational side view showing the display unit of the tenth embodiment.
Figure 27:
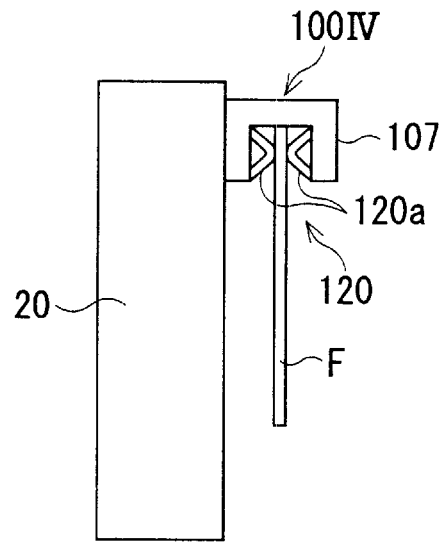
FIG. 27 is an elevational side view showing the display unit of the tenth embodiment together with a film.

FIG. 25 is a perspective view showing the display unit 20 in a tenth embodiment, and FIGS. 26 and 27 are side elevational views of the tenth embodiment. Again, similar portions to previous embodiments exhibit like references. The tenth embodiment is different from the ninth embodiment in that a film support unit 100IV is a horizontal channel 107 opening downwardly and extending along an upper edge of front surface 22 of the display unit 20. A clip 120 consisting of a pair of springs 120a is provided within the channel 107. The springs 120a are L-shaped bars resiliently biased against each other and fixed to opposing inner surface of the channel 107. An apex of each of the springs 120a abuts an apex of the opposing spring 120a, and these springs 120a form a V-shaped recess opening downwardly for receiving the film holder 23. When the film holder 23 is inserted into the clip 120, the springs 120a are forcibly opened in horizontal direction D. Thus, the clip 120 resiliently holds the film F. Since the film F is held by the film support unit 100IV at the upper edge of a display panel 22', a character displaying area E1' is provided at a lower portion of the display panel 22'. This invention has similar advantages to those of the first embodiment. Film sensors (S, S', S", S'") similar to previous embodiments can be provided in this embodiment, and the display changing switch may or may not be omitted as mentioned with respect to the previous embodiments.

Figure 28:
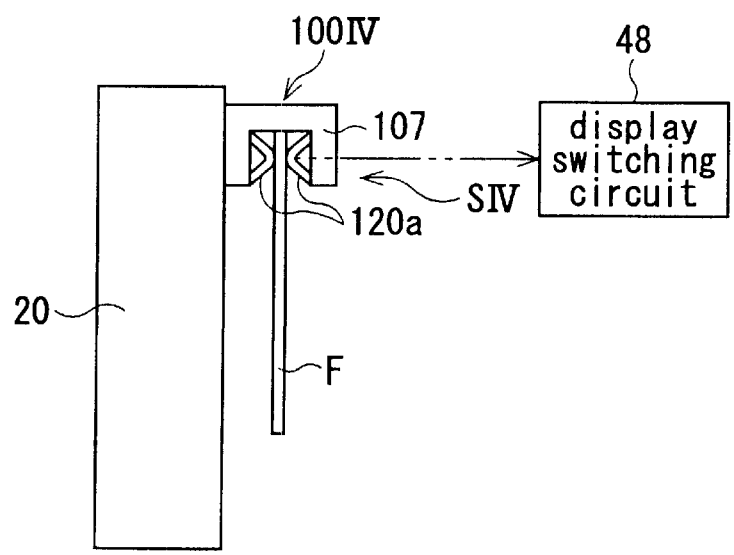
FIG. 28 is an elevational side view showing a display unit of an eleventh embodiment.

FIG. 28 shows an eleventh embodiment of another film sensor SIV. Again, similar portions to previous embodiments exhibit like references. The springs 120a are used as electrodes resiliently biased inwardly against each other. When the film F is inserted to the channel 107, the electrodes are disconnected from each other. This causes a signal to be output to the display switching circuit 48. Thus, a similar effect to that of the seventh embodiment is achieved.

Figure 29:
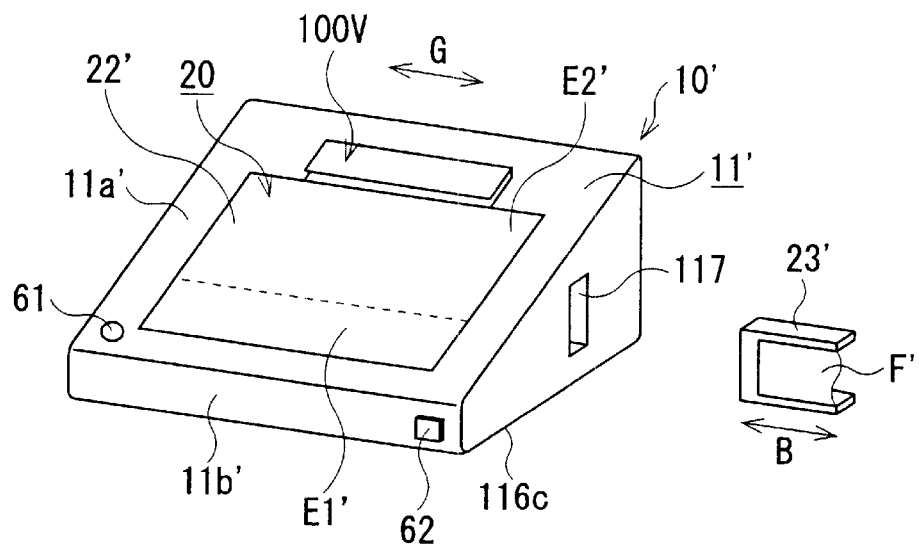
FIG. 29 is a perspective view showing a twelfth embodiment of a film scanner.
Figure 30:
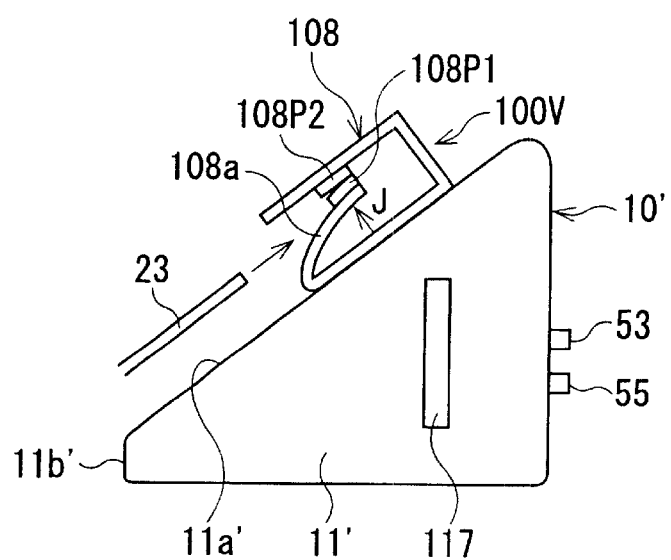
FIG. 30 is an elevational side view of the twelfth embodiment.

FIGS. 29 and 30 show a twelfth embodiment of a film scanner 10'. Again, similar portions to previous embodiments exhibit like references. FIG. 29 is a perspective view of the film scanner 10' and FIG. 30 is a side elevational view of the film scanner 10'. The film scanner 10' includes a wedge-shaped body 11' increasing in thickness toward a rear surface of the film scanner 10'. The display unit 20 comprises the display panel 22' directly fixed on an upper surface 11a' of the body 11', and which functions similarly to the display unit 20 and display panel 22 of the previous embodiments. The display changing switch 61 is provided on the upper surface 11a' and the main switch 62 is provided on a front surface 11b'. A horizontal through hole 117 is opened on a side surface at a rear portion of the body 11'. A film scanner unit (not shown) is provided in the through hole 117 for scanning an image on a film F'. The through hole 117 has a rectangular section for slidably supporting a film holder 23' as well as for supporting the front and back surface of the film vertically. The video input/output terminal 53 and the interface input/output terminal 55 are provided on the rear surface of the body 11' similarly to the first embodiment.

In the twelfth embodiment, a film support unit 100IV is a horizontal channel 108 opening toward the first surface 11b. A lower side of the channel 108, which contacts the upper surface 11a', has a resilient lip 108a projecting into the channel 108 and biased toward an upper side of the channel 108, opposite the lower side. Pads 108P1 and 108P2 are fixed on an outwardly-facing surface of the lip 108a and on an inner surface of the upper side of the channel 108, respectively, such that the pads 108P1 and 108P2, resiliently abut each other. The film holder 23 is guided by the lip 108a and is interposed between the pads 108P1 and 108P2. The film F is thus held by the film support unit 100IV. Since the display panel 22' is an inclined surface, the film is also supported by the panel 22' and, consequently, a resilient force J exhibited by the lip 108a need not be high.

Film sensors (S) similar to previous embodiments can be provided in this embodiment, and the display changing switch (61) may or may not be omitted, as mentioned with respect to the previous embodiments.

Figure 31:
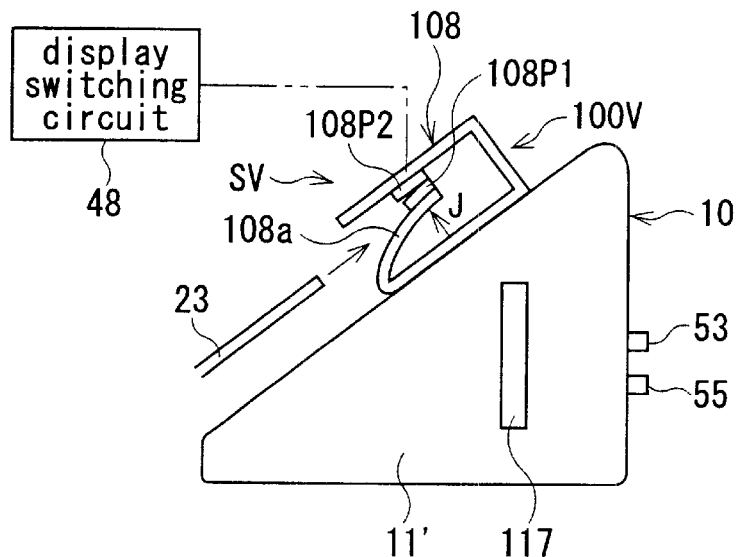
FIG. 31 is an elevational side view of a thirteenth embodiment of a film scanner.

However, another type of film sensor SIV can be used as in the thirteenth embodiment in FIG. 31. Again, similar portions to previous embodiments exhibit like references. Pads 108P1' and 108P2' are used as electrodes resiliently biased inwardly against each other. When the film F is inserted to the channel 108, the electrodes are disconnected from each other. This causes a signal to be output to the display switching circuit 48. Thus, a similar effect to that of the seventh embodiment is achieved.

Figure 32:
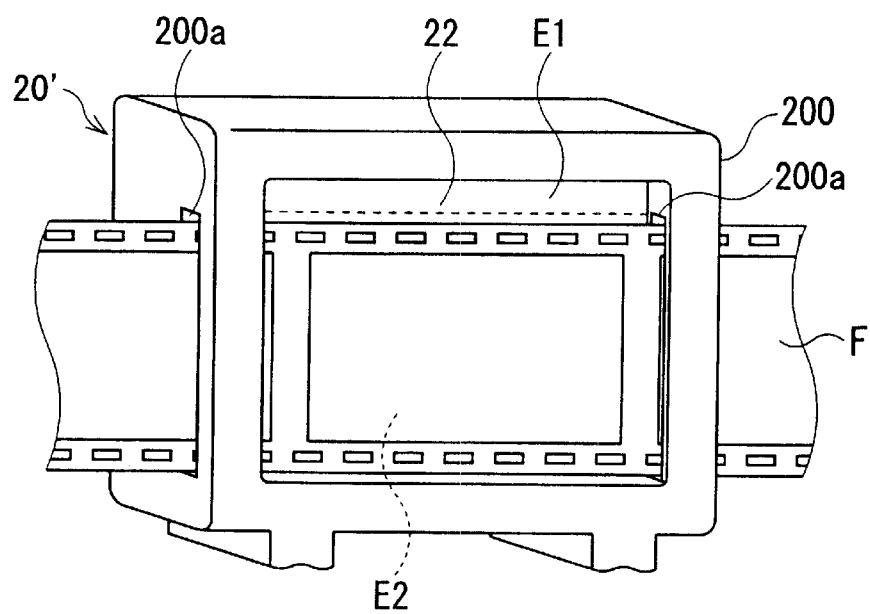
FIG. 32 is a perspective view showing a display unit of a fourteenth embodiment of a film scanner.

In the above embodiments, the film F is held by a film holder 23, however the film F can be directly supported by a display unit 20' as shown in a fourteenth embodiment of FIG. 32. Again, similar portions to previous embodiments exhibit like references. The display unit 20' includes a rectangular frame 200 surrounding the display panel 22

(22'). Horizontal through holes 200a are formed through vertical opposite sides of the frame 200. The through holes 200a have a section enabling support of the film F slidably inserted, such that the film F is held in front of the image area E2(E2') of the display panel 22(22'). Although the character displaying area E1 is provided at an upper portion of the display panel 22 in FIG. 32, the fourteenth embodiment may be modified to use the display panel 22' having display areas E1' and E2' as in FIG. 25. Thus, a similar effect to that of the seventh embodiment is achieved.

Figure 33:
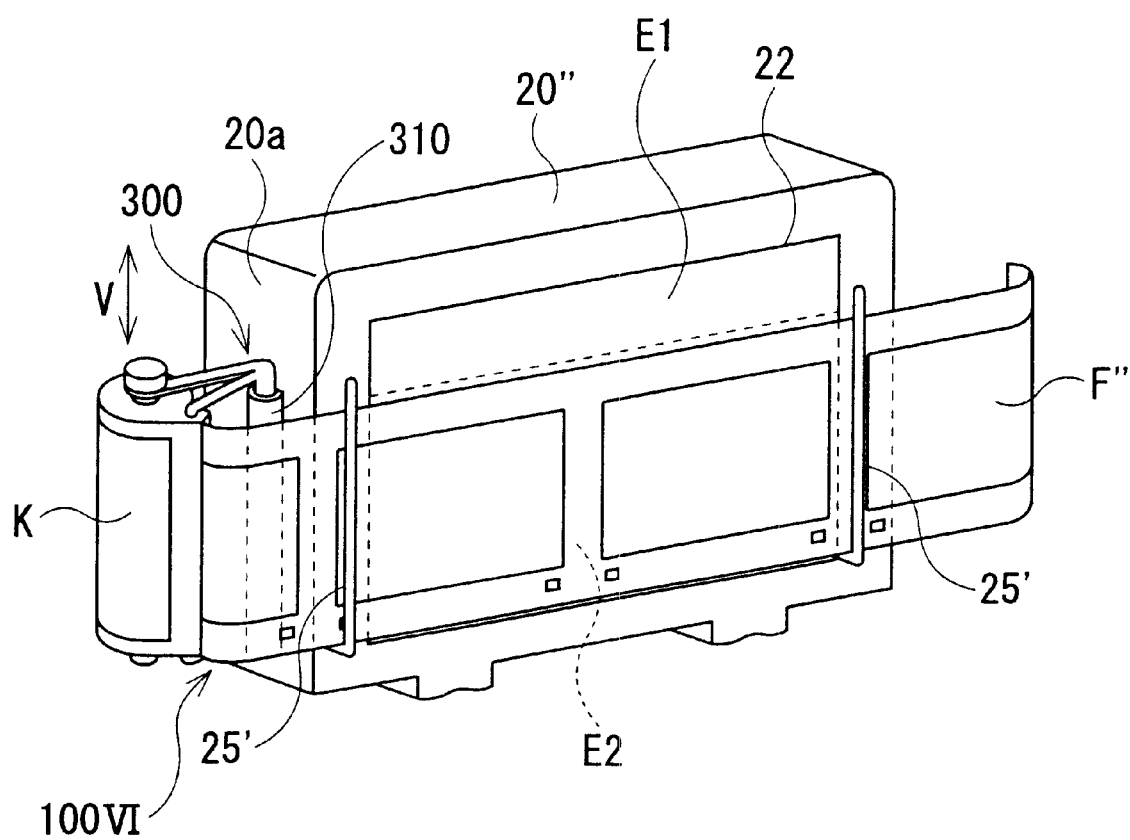
FIG. 33 is a perspective view showing a fifteenth embodiment of a film scanner.
Figure 34:
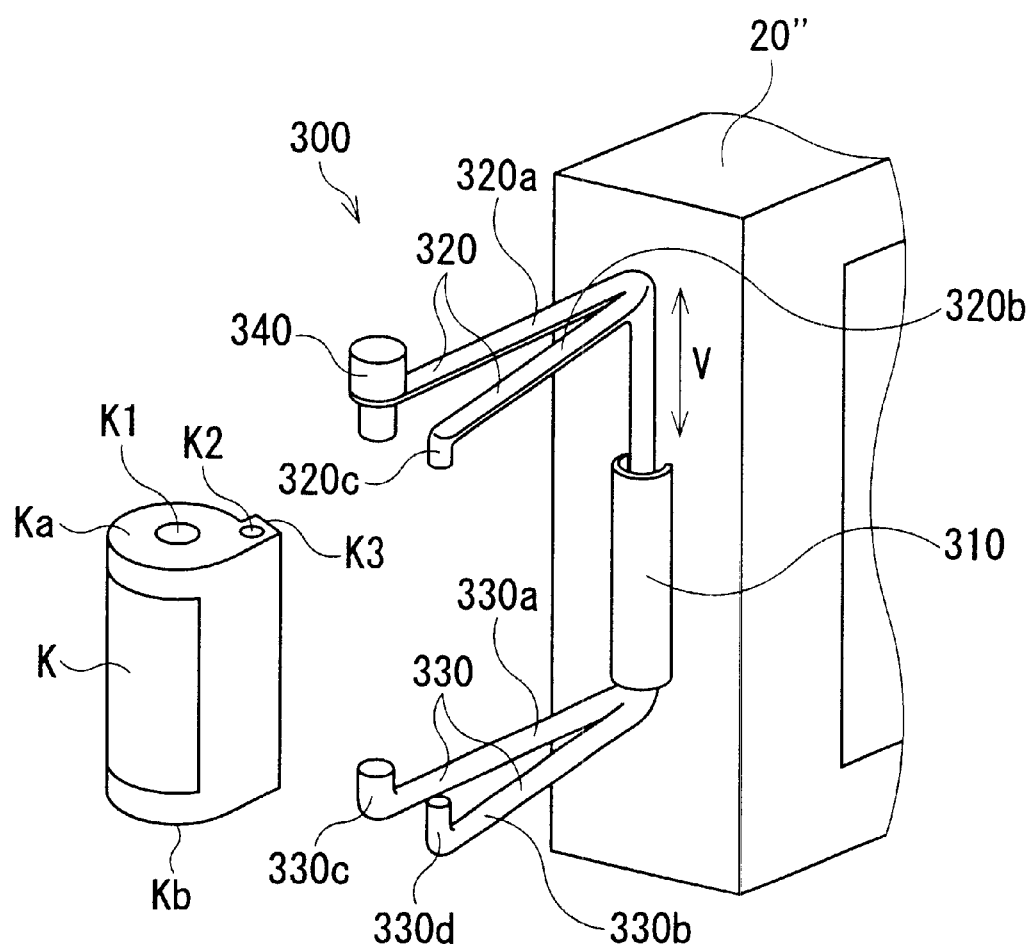
FIG. 34 is an enlarged perspective view showing a cartridge holder of the film scanner of the fifteenth embodiment.

In addition to the normal photographic film, the present invention can be applied to an advanced photographic system (APS), as shown in a fifteenth embodiment in FIGS. 33 and 34. Again, similar portions to previous embodiments exhibit like references.

In FIG. 33, a film support unit 100VI includes a pair of L-shaped hooks 25' for vertically supporting an APS film F" in front of the display area E2 of the display panel 22 of a display unit 20". On one side surface 20a of the display unit 20", a cartridge holder 300 is rotatably secured by a bearing 310, for holding a cartridge K of the APS. An upper area not concealed by the film F" is used as a character displaying area E1. Alternatively, the fifteenth embodiment may be modified to include the display panel 22' of FIG. 25.

As shown in FIG. 34, the cartridge K is a cylinder for storing the rolled film F". Recesses K1 are formed on a central axis of the cylinder at opposite end surfaces Ka and Kb, and a film outlet opening K3, which is normally closed, protrudes from the cylinder. Recesses K2 are formed adjacent to the film outlet opening K3 on opposite end surfaces Ka and Kb. In the recesses K2 a pin (not shown) is provided for opening the film outlet opening K3 when it is depressed.

The cartridge holder 300 includes an upper arm 320, vertically extendable and retractable into the bearing 230, and a lower arm 330 supported by the bearing 310, such that the cartridge K is resiliently held at the opposite end surfaces Ka and Kb by the arms 320. The arm 320 includes two arm portions 320a and 320b engaging the recesses K1 and K2 on surface Ka, respectively. A projection 320c projects downwardly at a free end of the arm portion 320b, such that the projection 320a engages the recess K2. A spindle 340 is rotatably fixed at a free end of the arm 320a, which projects downwardly, such that the spindle 340 engages the recess K1. The arm 330 includes two arm portions 330a and 330b engaging the recesses K1 and K2 on surface Kb, respectively. A projection 330c is projected upwardly at a free end of the arm portion 330a such that the projection 330c engages the recess K1. A projection 330d is projected upwardly at a free end of the arm portion 330b, such that the projection 330d engages the recess K2. The spindle 340 and the projection 330c are inserted to the recesses K1 vertically, and the projection 320c and 330d are inserted to the recesses K2 vertically. In the fifteenth embodiment, the arm 300 is rotatable around the bearing 310 in the clockwise direction, when viewed from above, and the opening K3 opens. Then the spindle 340 is rotated in the anti-clockwise direction, when viewed from above, such that the film F" is wound out of the cartridge K.

A user would thus manually insert the wound-off film F" onto the film support unit 100. Thus, a similar effect to that of the fourteenth embodiment is achieved.

Finally, it will be understood by those skilled in the art that the foregoing description is of preferred embodiments of the device, and that various changes and modifications may be made to the present invention without departing from the spirit and scope thereof.

The present disclosure relates to subject matters contained in Japanese patent application No.10-116950 (filed on Apr. 27, 1998) which is expressly incorporated herein, by reference, in its entirety.

What is claimed is:

1. A film scanner comprising:

an image scanner unit that scans an image recorded on a first photographic film supported at a first location;

a display unit that displays said image scanned by said image scanner unit; and a film support unit that supports a second photographic film at a second location in front of said display unit;

wherein said display unit is switchable to provide a white monochrome light so that an image recorded on the second photographic film is observable and to display a scanned image of the first photographic film supported at the first location.

2. The film scanner of claim 1, further comprising a film sensor that senses said second photographic film in front of said display unit.

3. The film scanner of claim 1, wherein said film support unit comprises a pair of L-shaped hooks that open upwardly to receive said photographic film.

4. The film scanner of claim 3, wherein said display unit is rotatable such that an inclination of said display unit is changeable.

5. The film scanner of claim 3, wherein said display unit is foldably stored against said image scanner unit and said image scanner unit comprises a film support receiving portion that receives said film support unit when said display unit is foldably stored.

6. The film scanner of claim 1, wherein said film support unit comprises a horizontal channel that opens upwardly to receive said second photographic film.

7. The film scanner of claim 1, wherein said film support unit comprises:

a horizontal channel that opens downwardly; and a clip disposed in said horizontal channel that resiliently holds said second photographic film.

8. The film scanner of claim 1, wherein said display unit has an inclined display panel, and said film support unit comprises:

a horizontal channel that opens downwardly, disposed along an upper surface of said display panel; and a clip disposed in said horizontal channel that resiliently holds said second photographic film.

9. The film scanner of claim 2, wherein said film sensor senses said second photographic film when said second photographic film is supported by said film support unit.

10. The film scanner of claim 2, wherein said film sensor comprises:

a light emitter that emits a light beam incident on said second photographic film; and a photo sensor that senses said light beam reflected by said second photographic film.

11. The film scanner of claim 6, further comprising a film sensor that includes:

an electrode having a base-end and a free-end, said electrode pivoting at said base-end, disposed at an edge of an opening of said horizontal channel, to vertically swing between a horizontal angle and an oblique angle contacting said free-end to an inner bottom surface of said horizontal channel, said electrode being pushed by said second photographic film to swing downwardly when said second photographic film is inserted into said horizontal channel such that said electrode contacts said inner bottom surface and generates a signal;

a spring that upwardly and resiliently biases said electrode to said horizontal angle; and a display switching circuit connected to said electrode that receives said signal and switches said display unit to exhibit said white mono-chrome light.

12. The film scanner of claim 6, further comprising a film sensor that includes a pair of electrodes separated by said second photographic film to generate a signal when said second photographic film is supported by said film support unit.

13. The film scanner of claim 6, wherein said film sensor comprises:

a light emitter disposed in said horizontal channel that emits a light beam; and a photo sensor disposed in said horizontal channel that receives said light beam, such that, when said second photographic film is supported by said film support unit, said light beam is blocked by said second photographic film and a signal is generated.

14. The film scanner of claim 7, wherein said clip comprises a pair of electrodes separated by said second photographic film to generate a signal when said second photographic film is resiliently supported by said clip.

15. The film scanner of claim 8, wherein said clip comprises a pair of electrodes separated by said second photographic film to generate a signal when said second photographic film is resiliently supported by said clip.

16. The film scanner of claim 1, wherein said display unit includes a display panel and said film support unit comprises a frame surrounding said display panel, a through-hole being formed in said frame to slidably support said second photographic film in front of said display panel.

17. The film scanner of claim 1, wherein said film support unit comprises a cartridge holder that holds a cartridge of an advanced photo system (APS), said film support unit supporting an APS film of said cartridge, said APS film corresponding to said second photographic film.

18. A film scanner comprising:

an image scanner that scans an image recorded on a first photographic film;

a display unit that switchably displays one of said image scanned by said image scanner and a white monochromatic light, said display unit being rotatably attached to said scanner such that an inclination of said display unit is changeable and said display unit is foldably stored against said image scanner;

a film support that supports a second photographic film in front of said display unit;

a film sensor that senses said second photographic film when said second photographic film is supported by said film support; and a film support receiving portion that receives said film support when said display unit is foldably stored.

19. The film scanner according to claim 1, said display, when displaying said white monochrome image, providing a light source for illuminating the second photographic film positioned in front of said display unit.

* * * * *